Figure 1:
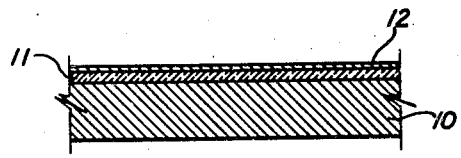

March 8, 1949.  M. S. MAIER  2,464,141

MIRROR WITH LOW THERMAL EXPANSION SUPPORT

Filed July 13, 1946

Martin S. Maier
INVENTOR

BY
ATTORNEYS

Patented Mar. 8, 1949

2,464,141

UNITED STATES PATENT OFFICE 2,464,141

MIRROR WITH LOW THERMAL EXPANSION SUPPORT

Martin S. Maier, Rochester, N. Y., assignor to Eastman Kodak Company, Rochester, N. Y., a corporation of New Jersey Application July 13, 1946, Serial No. 683,404

5 Claims. (Cl. 88—105)

This invention relates to mirrors and more particularly to a mirror construction suitable for use in precision optical instruments, such as range finders, and having substantially no dimensional change over wide temperature ranges or when subject to a temperature gradient.

In the Arnold and Norton U. S. patent application Serial No. 590,826, filed April 28, 1945, now Patent 2,430,551, there is described and claimed an improved optical support for penta reflector mirrors for range finders which assures that the mirror assemblies will be maintained in the desired relative planes irrespective of temperature gradients in the optical supports. This is accomplished by forming the supports from a material having a relatively low thermal expansivity or by employing a shield of high thermal conductivity adjacent the optical support to drain off undesirable heat. If desired, both features can be employed in connection with the penta reflector assembly. It has been found that these arrangements work well to maintain the various mirrors in the penta reflector in the correct relative orientation.

However, during calibration of range finders at various temperatures, it was found that another source of error in the range finders is due to changes in the reflecting angle of the penta reflector mirrors which changes are caused by temperature gradients in the mirror structure itself rather than in the supporting assembly. It was found that temperature gradients exist across the surface of the mirrors as well as between the front and back of the mirrors. These temperature gradients produced distortion of the reflecting plane which are also varied in effect depending on the general temperature changes of the surrounding atmosphere. Measurements of these deviations in various penta reflector mirrors indicated that many were not stable enough to give the high precision desired. It is evident that the above-mentioned invention of Arnold and Norton would not correct for surface distortions in the mirrors themselves. The solution of this problem was the primary object of the present invention which thus gave further precision to this optical instrument. It will be apparent that the invention also has general application to many other optical instruments which include mirror systems.

An object, therefore, of the present invention is a mirror having negligible dimensional change over wide temperature ranges. Another object of the invention is a mirror having negligible dimensional change when the mirror is subject to a temperature gradient. A further object of the invention is an improved mirror structure, suitable for use in penta reflector assemblies, in which the effects of thermal gradients are minimized. Since, as will be pointed out later, the invention includes the bonding of glass to low expansion metals, one ancillary object is the provision of a method for obtaining the most preferred form of the Arnold and Norton invention mentioned above, namely the form in which the assembly structure is substantially entirely of low expansivity materials.

In accordance with one feature of the invention, these and other objects are attained by constructing a mirror with a base made from a metal, preferably an alloy, having substantially no dimensional change over wide temperature ranges or when subjected to temperature gradients. On this metal base is directly bonded a very thin glass layer, the glass being selected for its low thermal expansion coefficient and its ability to form a smooth surface which can be polished to a flat surface. Over the thin glass layer is coated an even thinner layer of a metal which is adapted to have a high mirror-like polish. In this preferred embodiment, the thin glass and thin metal layers being affixed to the substantially constant dimension alloy base contribute practically nothing to the thermal changes of the mirror, and thus the total effective coefficient of thermal change is within permissible tolerances.

The alloy base preferably comprises a cobalt-iron-chromium alloy having a coefficient of expansion of approximately $0.5 \times 10^{-6}$ per °C. over a temperature range of $-60°$ C. to $+60°$ C. and which undergoes no phase change on heating or cooling at least within this range. The composition of the alloy must be carefully controlled and is usually prepared by employing metal powders in order to obtain the exact proportions in the resulting alloy. The preferred alloy contains cobalt 54.3%, iron 36.7%, chromium 9.5%. It has been determined that if any one of these metals varies in amount ±.5%, then the mirror will not have the desired accuracy under thermal changes. This alloy was obtained from a commercial supplier.

The thin glass layer which is bonded to the alloy base may be made from flint glass or crown glass or optical glass which is available on the market.

The metal reflecting surface which is coated on the glass layer is preferably composed of aluminum, to provide high reflectivity.

Figure 2:
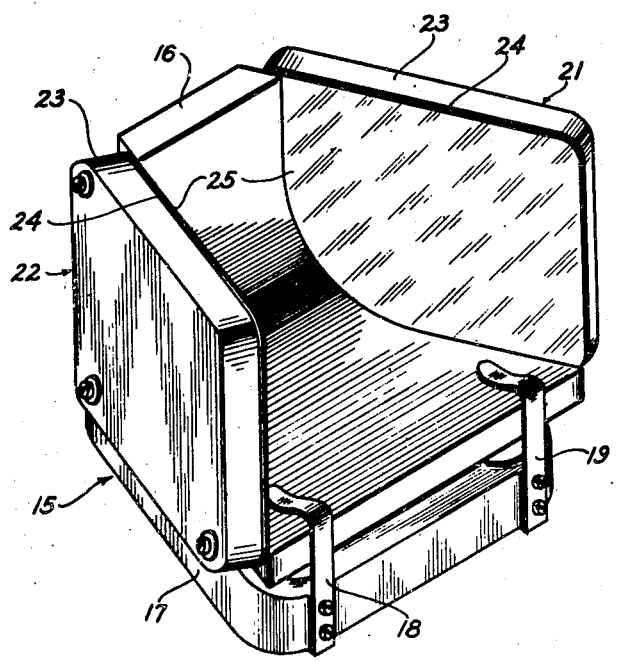

The invention is further illustrated in the accompanying drawings in which Fig. 1 is a view of a simple mirror made in accordance with the invention, and Fig. 2 is a perspective view of a penta reflector assembly such as is employed in certain range finders and having mirror surfaces made as above described.

The mirror shown in Fig. 1 may be advantageously made from a flat surfaced block 10 of the preferred alloy approximately ½ inch thick. This is suitably cleaned in CCl₄ to remove grease or other foreign matter from its surface. The block is then dried and given a light sand blast to remove any residual scale and to roughen the surface slightly. A sheet of flint glass 11 having a thickness of approximately 1/16 of an inch is then placed over the slightly roughened surface and heated in a furnace to the softening point of the glass (1300° F.) and slowly cooled in an annealing furnace to relieve the strains in the glass. This results in a tenacious bond between the alloy and the glass.

The glass surface is then polished, by usual processes, to be flat within 5 optical interference (Newton) rings or better as measured on an interferometer. The polished glass surface is then coated by any suitable method, such as spraying or vacuum distillation, with an aluminum coating 12 to produce a reflecting surface which is also carefully maintained flat within 5 optical interference rings.

The glass layer 11 may be formed on the alloy base 10 by fusing powdered glass thereto instead of employing a formed glass sheet. In this case, the surface of the alloy block 10 is prepared by grinding with rough, smooth, and fine emery after which the surfaces are washed with xylol and cleaned with steel wool.

The following process steps in the application of powdered glass to metal may be employed.

1. The metal is preheated at 1160–1200° F. for 20 minutes in a furnace.
2. A light coat of flint glass powder is applied to the metal surface through a 40 mesh screen.
3. The coated metal is returned to furnace at 1160° F. and fused for 10 to 15 minutes.
4. The metal is removed and a second light and uniform coat is applied after which it is returned to the furnace. This process is repeated until the desired thickness of glass is obtained.
5. The fused glass-to-metal is then held at 1160° F. for two to four hours to allow seed to rise to the top and break. This eliminates pitting of the surface.

When a thin coating of glass is desired, the powdered glass is applied to the metal through a 40 mesh screen until about 1/16 inch of powder is on the metal. When this is fused for 1 to 3 hours, a layer of glass 1/64 inch thick is obtained.

Metal mirrors, thus made, are free from distortion resulting from temperature changes as was proved by measurements on an interferometer made when the mirrors were at room temperature, when cooled to 0° F. and when heated to 200° F. The patterns at these temperatures differed by less than ½ of a Newton ring.

Referring to Fig. 2, there is shown a penta reflector assembly 15, all parts of which are made from the preferred cobalt-iron-chromium alloy. The assembly comprises a penta block 16 which is suitably mounted on a base 17 through members, not shown. The block 16 is maintained in contact with the base 17 by means of springs 18 and 19. Mirrors 21 and 22 are mounted opposite to each other on block 17. These mirrors are made in accordance with the invention as described in some detail in connection with Fig. 1. They comprise a base of the preferred alloy 23 with a glass layer 24 bonded thereto and with an aluminum layer 25 thereover. By preparing the mirrors in accordance with the invention, they have a negligible dimensional change over wide temperature ranges and are substantially not affected by temperature gradients which may be presented in them.

The complete penta reflector assembly is particularly valuable in range finders employed as in the field, when temperature conditions cannot be controlled. The angular deviations in this penta reflector are vanishingly small.

While for extremely accurate optical instruments, we prefer to employ as the base of the mirrors the above-described cobalt-iron-chromium alloy, other mirrors for use in less accurate optical systems can be made with alloys and metals having greater thermal expansion coefficients.

In accordance with another feature of the invention, a very satisfactory mirror can be made by employing as the base of the mirror assembly a steel block on which is bonded, as above described, a thin glass layer and which after being polished to be flat within 5 optical interference rings is overcoated with the aluminum reflecting layer which is also maintained flat within 5 optical interference rings. This mirror had a change in pattern with a 50° C. temperature change of less than ½ optical interference ring.

Another satisfactory mirror assembly was made by employing as the base, a copper alloy metal. This has thermal properties comparable to copper, but it is much harder and the temperature gradient effects are small. The ratio of the thermal conductivity to thermal expansion for this alloy is about the same as for the low-expanding cobalt-iron-chromium alloy. The glass layer with the overcoating of aluminum is placed on this alloy base as previously described. The dimensions of the base and the glass and metal reflecting coats are similar to those described previously. This mirror had a change of less than 5 optical interference rings over a 50° C. temperature range.

If desired, the mirror structures described above may be modified somewhat to incorporate other desirable features. To enable a wider variety of glass to be used, the metal or alloy base may be initially coated with a smooth enamel layer by conventional methods and the glass coating added thereon. The enamel will provide a tenacious bond between the base and substantially any of the more common glasses many of which themselves will not bond directly to metal. These glasses are polished by conventional methods and the reflecting aluminum surface is placed thereon as described above. The metal overcoat provides the reflectivity required. The main body of the mirror, however, being a metal or alloy block dissipates thermal gradients harmlessly whereas solid glass mirrors are subject to distortion or warping by thermal gradients.

I claim:

1. A mirror structure having a base of an alloy containing approximately 54% cobalt, 36.5% iron, 9.5% chromium, with a layer of glass bonded thereto and overcoated with a reflecting metal surface and having substantially no dimensional change over wide temperature ranges.

2. A mirror structure having a base of an alloy containing 54% cobalt, 36.5% iron, 9.5% chromium, with a thin layer of glass and overcoated with a thin layer of polished aluminum and having substantially no dimensional change over wide temperature ranges.

3. A mirror structure having a base of an alloy containing 54% cobalt, 36.5% iron, 9.5% chromium, with a thin layer of flint glass bonded thereto and overcoated with a thin layer of polished aluminum.

4. A mirror structure for use in optical systems of high precision having a base of an alloy containing approximately 54% cobalt, 36.5% iron, 9.5% chromium, and having a coefficient of expansion of approximately $0.5 \times 10^{-6}$ per °C. with a layer of flint glass bonded thereto and overcoated with a thin layer of polished aluminum, said mirror structure having a total effective coefficient of thermal change less than the permissible error in said high precision optical systems.

5. A mirror structure having a base of an alloy containing approximately 54% cobalt, 36.5% iron, 9.5% chromium with a layer of glass bonded thereto and overcoated with a reflecting metal surface and having substantially no dimensional change over a temperature range of −60° F. to +60° F.

MARTIN S. MAIER.

REFERENCES CITED

The following references are of record in the file of this patent:

UNITED STATES PATENTS

| Number | Name | Date |
|---|---|---|
| 1,027,426 | Von Hofe | May 28, 1912 |
| 2,218,270 | Snook | Oct. 15, 1940 |
| 2,375,669 | McKinney | May 8, 1945 |
| 2,400,111 | Gardner | May 14, 1946 |

FOREIGN PATENTS

| Number | Country | Date |
|---|---|---|
| 16,509 | Great Britain | Aug. 21, 1913 |
| 332,653 | Germany | Feb. 7, 1921 |